(12) United States Patent
MacKarvich

(10) Patent No.: US 8,342,559 B1
(45) Date of Patent: Jan. 1, 2013

(54) SELF LOCKING TRAILER HITCH

(76) Inventor: Charles J. MacKarvich, Atlanta, GA (US)

( * ) Notice: Subject to any disclaimer, the term of this patent is extended or adjusted under 35 U.S.C. 154(b) by 0 days.

(21) Appl. No.: 13/172,014

(22) Filed: Jun. 29, 2011

(51) Int. Cl.
*B60D 1/06* (2006.01)

(52) U.S. Cl. ....................................... 280/507

(58) Field of Classification Search ............... 280/507, 280/511
See application file for complete search history.

(56) References Cited

U.S. PATENT DOCUMENTS

| 2,363,755 | A | | 9/1943 | Smith |
| 2,971,777 | A | | 2/1960 | Weber et al. |
| 3,770,298 | A | * | 11/1973 | Phillips .................. 280/457 |
| 3,792,432 | A | | 2/1974 | Ellis et al. |
| 3,954,286 | A | | 5/1976 | Weber |
| 5,080,386 | A | | 1/1992 | Lazar |
| 6,375,211 | B1 | | 4/2002 | MacKarvich |
| 6,505,849 | B1 | | 1/2003 | Ebey |
| 7,413,212 | B2 | * | 8/2008 | Hsai ........................ 280/507 |
| 7,690,673 | B1 | * | 4/2010 | Kraai ....................... 280/507 |
| D630,974 | S | | 1/2011 | MacKarvich |

FOREIGN PATENT DOCUMENTS

EP 0370225 5/1990

* cited by examiner

*Primary Examiner* — Tony Winner
(74) *Attorney, Agent, or Firm* — Thomas|Horstemeyer, LLP

(57) ABSTRACT

A ball latch 46 is reciprocally mounted in a latch slot 44 and is biased downwardly by coil compression spring 68 until the semi-spherical recess at its lower end becomes coextensive with the spherical surface of the ball socket 36. When the trailer hitch 16 is placed on the hitch ball 26, the force applied by the hitch ball against the ball latch 46 moves the ball latch upwardly against the bias of its spring 68 to make room for the hitch ball to enter the ball socket 36. Once the hitch ball is fully inserted in the ball socket 36, the spring 68 pushes the ball latch 46 back to its locked position about the hitch ball.

11 Claims, 7 Drawing Sheets

SELF LOCKING TRAILER HITCH

FIELD OF THE INVENTION

This invention generally comprises a trailer hitch that is used to connect a towed trailer to the hitch ball of a towing vehicle. More particularly, the invention concerns a trailer hitch that automatically locks itself to the hitch ball of a towing vehicle.

BACKGROUND OF THE INVENTION

Trailer hitches for small vehicles usually include a socket that connects to a hitch ball mounted on the rear end of a towing vehicle. The trailer usually includes a forwardly extending trailer draft tongue that includes a coupler having the downwardly facing ball socket that is to be placed over and pivotally connects to the hitch ball.

When the towing vehicle is to be connected to the trailer, the operator typically elevates the trailer tongue so that the socket of the coupler is at a slightly higher level than the level of the hitch ball that is carried by the towing vehicle. The operator backs the towing vehicle toward the anticipated position of the socket of the coupler until the operator estimates that the hitch ball is aligned below the socket of the coupler. The operator then stops the vehicle, exits the vehicle and lowers the trailer tongue until the socket of the hitch registers with the hitch ball and the trailer is mounted to the hitch ball.

It is important that the ball socket of the coupler is properly mounted on and is locked to the hitch ball, and most trailer hitches include a lever actuated latch that is movable to extend a locking element from the trailer hitch to a position in abutment with the neck of the hitch ball, below the larger lateral breadth of the hitch ball for locking the trailer hitch to the hitch ball of the towing vehicle. Without this type of lock, there is a hazard that the trailer hitch will tend to bounce off the hitch ball upon the vehicle and/or the trailer passing over bumps in the road, or upon braking or accelerating, or upon side forces received from winds, or turns of the towing vehicle, etc., or upon the trailer being out of balance. Accordingly, the driver of a towing vehicle, when in the driver's position within the vehicle, is not likely to remain in the vehicle and to allow someone else to lock the trailer hitch to the hitch ball of the towing vehicle. This means that the driver is likely to apply the emergency brakes to the towing vehicle, exit the truck, and then make sure that the lock is secure between the trailer and the towing vehicle. While this operation is likely to increase the safety of the connection between the towing vehicle and the trailer, it leaves the towing vehicle and the trailer unattended for accidental movement during the locking procedure. Also, it is possible that the conventional latch device used to connect the trailer top to the ball hitch might be inadvertently left open or could be accidently engaged by another obstacle that causes the latch to open.

It is to the above described problem that the following disclosure is directed.

SUMMARY OF THE DISCLOSURE

Briefly described, the present disclosure concerns a trailer hitch for mounting the draw bar of a trailer to a conventional hitch ball of a towing vehicle. The hitch ball includes a substantially dome shaped upper portion and a lower portion that converges beneath the larger lateral breadth of the dome shaped upper portion to a stem of a smaller breadth. The trailer hitch may include a socket housing that defines a downwardly facing ball socket for mounting on the upwardly facing hitch ball. The ball socket may define a downwardly facing substantially semi-spherical upper interior surface that corresponds in size and shape to the substantially semi-spherical hitch ball.

A ball latch may be supported by the socket housing adjacent the ball socket for engaging the hitch ball at the stem of the hitch ball below the larger intermediate lateral breadth of the hitch ball for locking the trailer hitch to the hitch ball of the towing vehicle.

The trailer hitch herein disclosed may include a ball latch with a concave surface that is substantially coextensive with the semi-spherical interior surface of the ball socket when engaging the hitch ball at the stem of the hitch ball below the larger lateral breadth of the hitch ball.

The concave surface of the ball latch may include an arcuate surface, and a biasing means may be supported by the socket housing for urging the ball latch toward the hitch ball at the stem of the hitch ball for locking the ball latch to the hitch ball.

The biasing means may include a coil compression spring that engages the ball latch, and a latch pin may be connected to the ball latch with a coil compression spring surrounding the latch pin for urging the ball latch toward its locked position.

A latch slot may be formed in the socket housing, with the ball latch movable along the latch slot into and out of the locking position with respect to the hitch ball, with the spring positioned in the latch slot for urging the ball latch toward the hitch ball at the stem of the hitch ball below the larger lateral breadth of the hitch ball for locking the trailer hitch to the hitch ball of the towing vehicle.

The above described features of this disclosure, as well as the others hereinafter described, provide a trailer hitch that, when applied to the hitch ball, is self-locking. The trailer hitch has a latch that is urged out of the way when the hitch socket is lowered onto the hitch ball to allow the socket to become properly placed on the hitch ball, and once properly positioned on the hitch ball, the latch is biased into locking engagement with the hitch ball.

This provides the vehicle operator with the knowledge that once the trailer hitch is mounted to the hitch ball, it is locked in place and does not require his personal attention to properly secure the trailer hitch to the hitch ball. This reduces the hazard of improper locking of the trailer hitch to a hitch ball.

DETAILED DESCRIPTION

Figure 1:
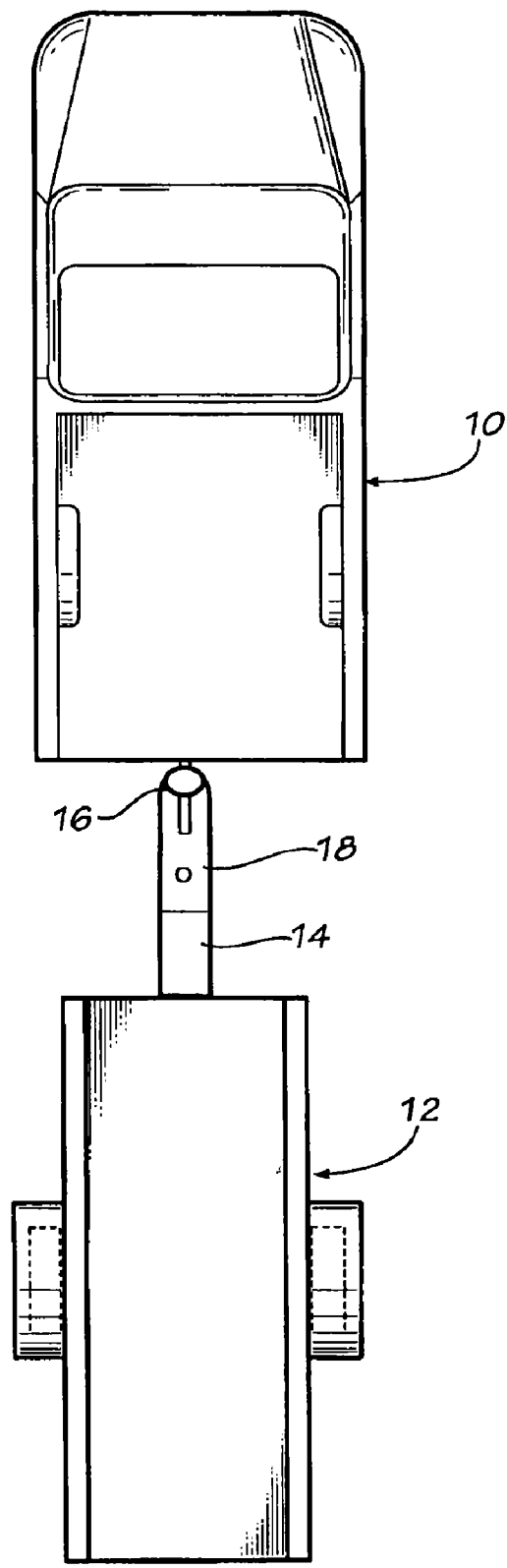
FIG. 1 is a top view of a towing vehicle and a trailer connected thereto with the trailer hitch that mounts the draw bar of the trailer to the hitch ball of the towing vehicle.

Referring now in more detail to the drawings, in which like numerals indicate like parts throughout the several views, FIG. 1 illustrates a towing vehicle, such as a pickup truck 10 and a trailer 12 that includes a draft draw bar 14 extending between the trailer and the towing vehicle, and a trailer hitch 16 mounted on the front end of the draw bar 14 that engages a conventional hitch ball mounted to the rear of the towing vehicle 10.

Figure 2:
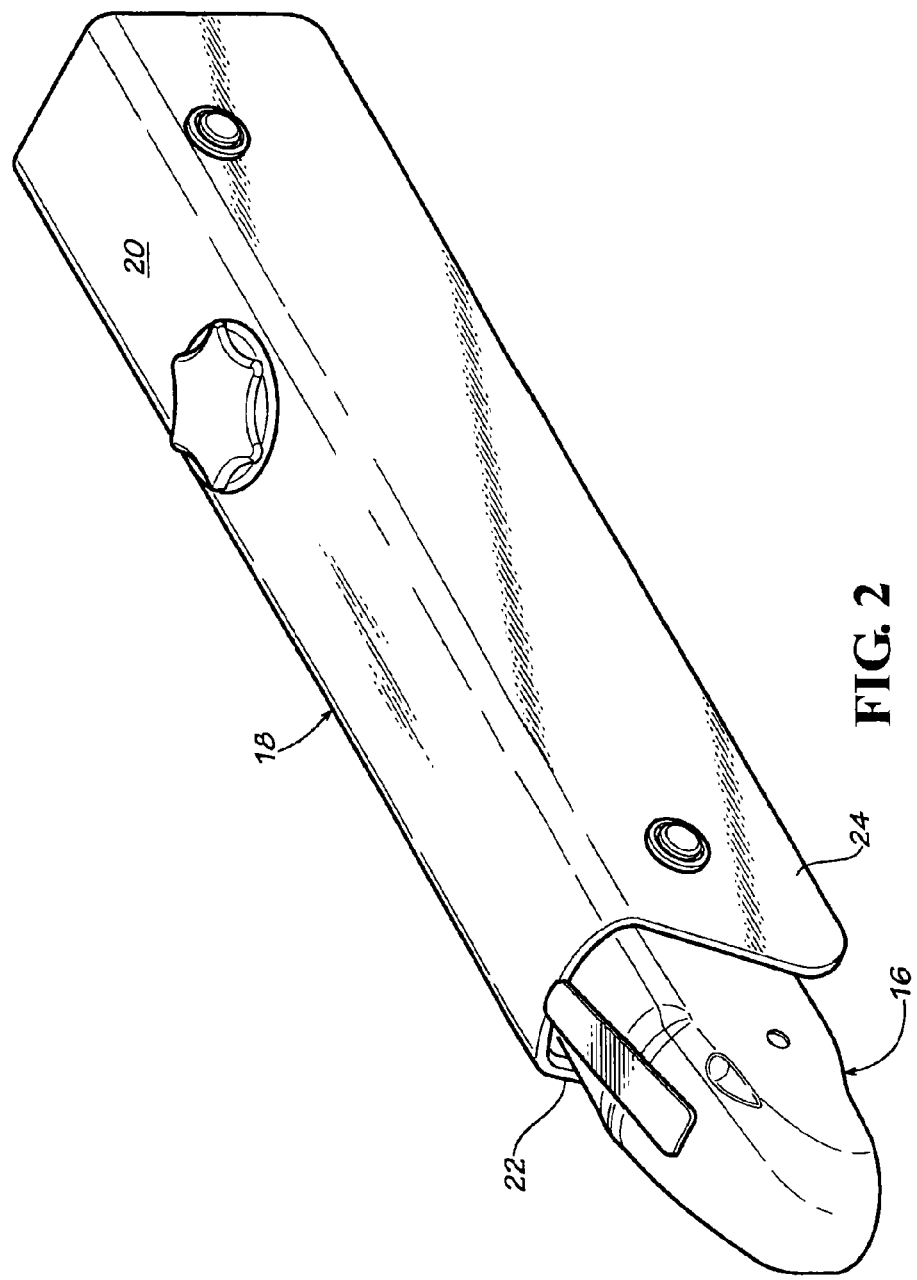
FIG. 2 is a perspective view of the trailer hitch of FIG. 1.
Figure 3:
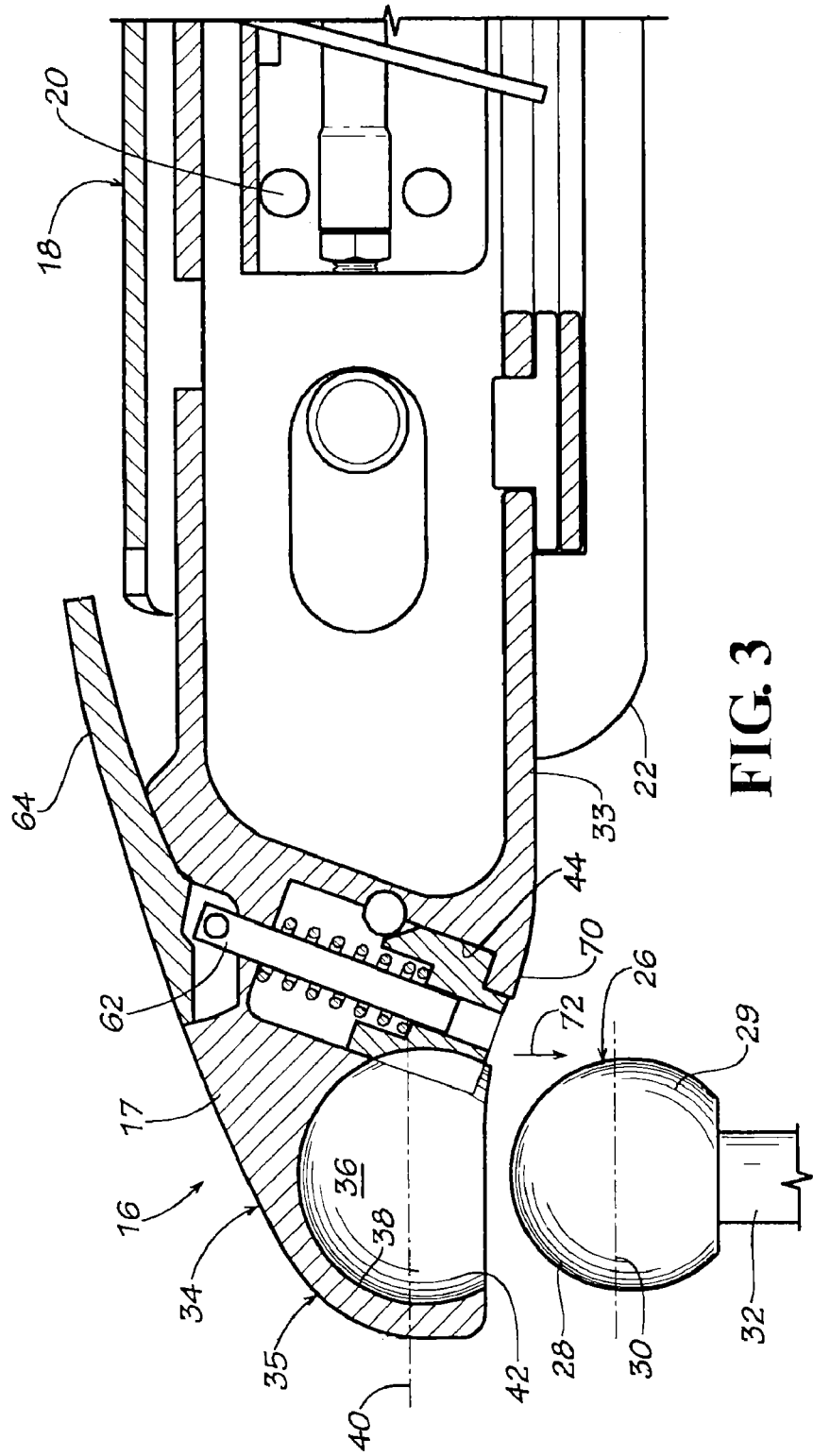
FIG. 3 is a side cross-sectional view of the trailer hitch of FIG. 2, with a hitch ball shown spaced beneath the trailer hitch.
Figure 4:
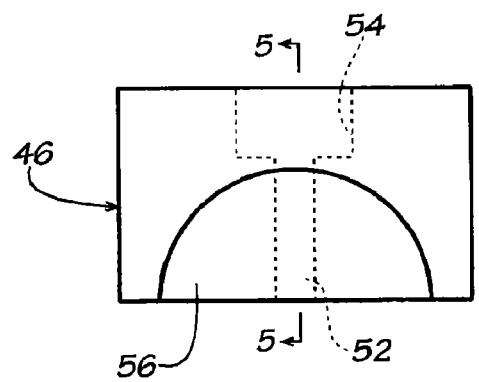
FIG. 4 is a front view of the ball latch.
Figure 5:
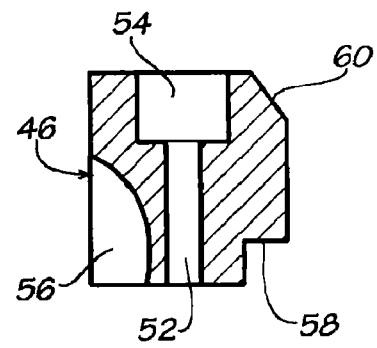
FIG. 5 is a side cross-sectional view of the ball latch of FIG. 4, taken along lines 5-5 of FIG. 4.
Figure 7:
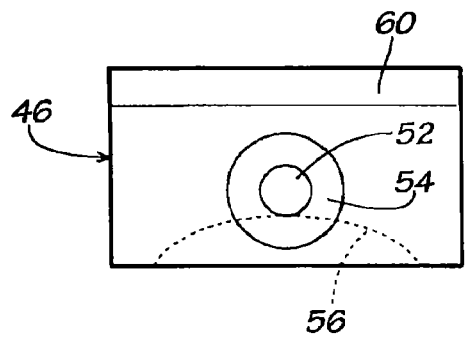
FIG. 7 is a top view of the ball latch of FIGS. 4-6.
Figure 6:
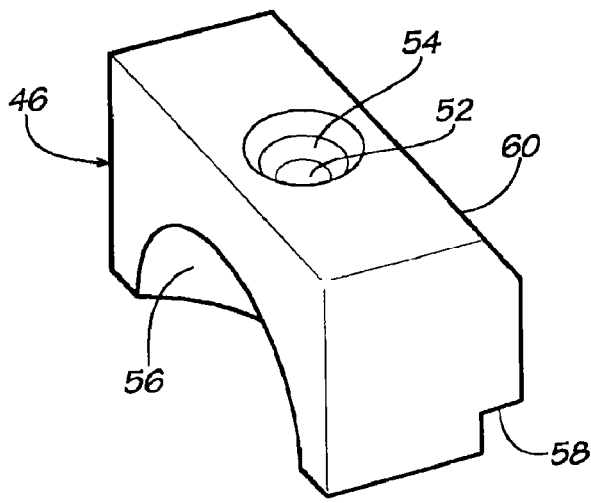
FIG. 6 is a perspective view of the ball latch of FIGS. 4 and 5.

Trailer hitch 16 is shown in more detail in FIGS. 2 and 3 of the drawings. As shown in FIG. 2, the trailer hitch 16 includes a mounting sleeve 18 that is mounted to the forward end of the draw bar 14. The mounting sleeve typically will be formed in an inverted U-shape, with a horizontal top wall 20 and opposed vertically oriented side walls 22 and 24. Mounting sleeve 18 supports at its forward end the trailer hitch 16 and also supports the brake cylinders, electrical wiring and other components not further described herein.

As shown in FIG. 3, the trailer hitch 16 is to be mounted on a conventional hitch ball 26. The hitch ball includes a semi-spherical shape that includes a dome-shaped upper portion 28 that expands downwardly to the large lateral intermediate breadth 30 at the dash line, then to a lower portion that contracts to a smaller breadth 29, and is mounted on a vertical stem 32. This is conventional in the art.

As shown in FIG. 3, trailer hitch 16 includes a hitch body 34 that includes a socket housing 35 and a rear mounting portion 33. The socket housing 35 is telescopically received in mounting sleeve 18.

Socket housing 35 has a downwardly facing ball socket 36 for mounting on a hitch ball 26. The ball socket 36 defines a substantially semi-spherical interior surface 38 that expands outwardly from its upper portion to a large intermediate lateral breadth 40 as represented by a dash line in FIG. 3, then converges inwardly and terminates at the downwardly facing horizontal opening 42. The opening 42 of the ball socket 36 is of smaller breadth than the large lateral intermediate breadth 30 of the hitch ball 26. The size and shape of the ball socket 36 corresponds to the size and shape of the hitch ball 26 so that the ball socket may snugly fit over the hitch ball and the trailer hitch may rotate on the hitch ball.

A latch slot 44 extends diagonally in the socket housing 35 and at its lower end intersects a side of the ball socket and forms a latch opening 50 (FIGS. 8 and 10) that extends from above the large lateral breadth 40 of the ball socket, downwardly through the edge of the socket opening 42. The latch opening 50 is formed in the rear side and lower portion of the ball socket 36.

Ball latch 46 is positioned in latch slot 44 and is movable along the length of latch slot 44 toward and away from the latch opening 50.

Ball latch 46 is shown in more detail in FIGS. 4-7. Ball latch 46 is generally rectangular and includes a through bore 52, and a counter bore 54 at the upper end of the through bore. A semi-spherical recess 56 is formed on the front face of the ball latch 46, with the recess intersecting the front face and the bottom surface of the ball latch. The rear surface of the ball latch includes a step 58 that faces downwardly. A beveled edge 60 faces upwardly.

Figure 8:
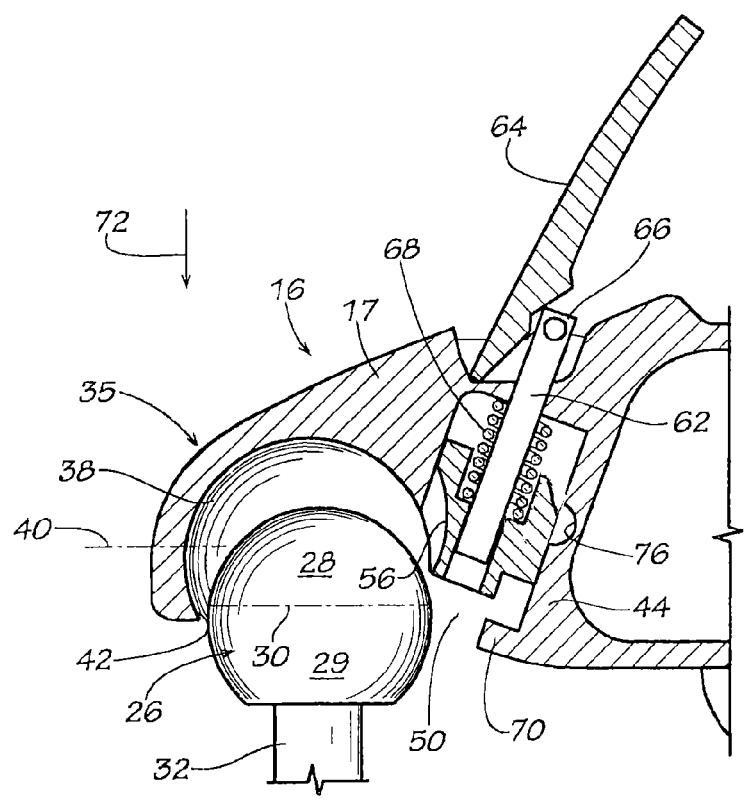
FIG. 8 is a side cross-sectional view of the trailer hitch of FIG. 2, as the hitch is moved down onto the hitch ball, showing the latch being pushed out of the way to allow the hitch ball to enter the socket of the hitch.
Figure 9:
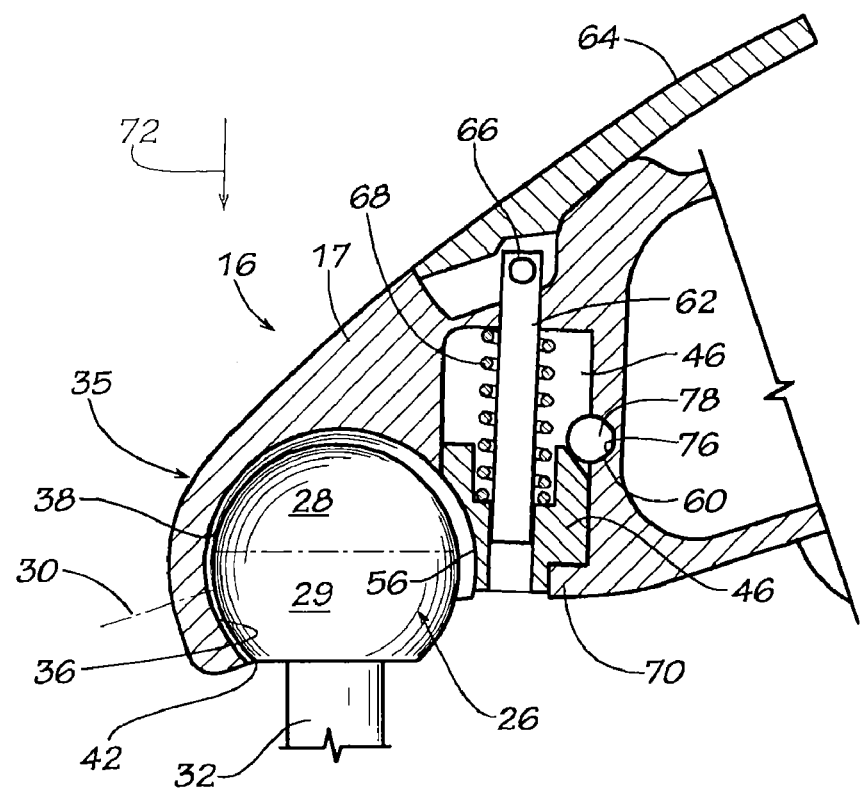
FIG. 9 is a side cross-sectional view of the trailer hitch of FIG. 8, with a hitch ball positioned in the socket and the latch closed about the bottom portion of the hitch ball.

As shown in FIGS. 8 and 9, latch pin 62 is pivotally connected to latch lever 64 by pivot pin 66, and latch pin 62 extends from latch lever 64 through the upper portion of latch slot 44 and is connected at its lower portion to ball latch 46. The lower portion of the latch pin 62 extends through the counter bore 54 and into the through bore 52 and is connected to the through bore. Coil compression spring 68 extends into the counter bore 54 and about the latch pin 62 and the upper end of the spring 68 engages the upper interior surface of the latch slot 44 and functions as a biasing means for urging the ball latch 46 downwardly in the latch slot 44 until its step 58 engages a flange 70 of the socket housing 35. When the ball latch 46 is in its lowermost position, its semi-spherical recess 56 will be coextensive with the spherical shape of the ball socket 36, as shown in FIG. 3. However, when the latch lever 64 is tilted upwardly as shown in FIG. 10, it withdraws the ball latch 46 from the lower portion of the latch slot 44, which opens the latch opening 50.

Figure 10:
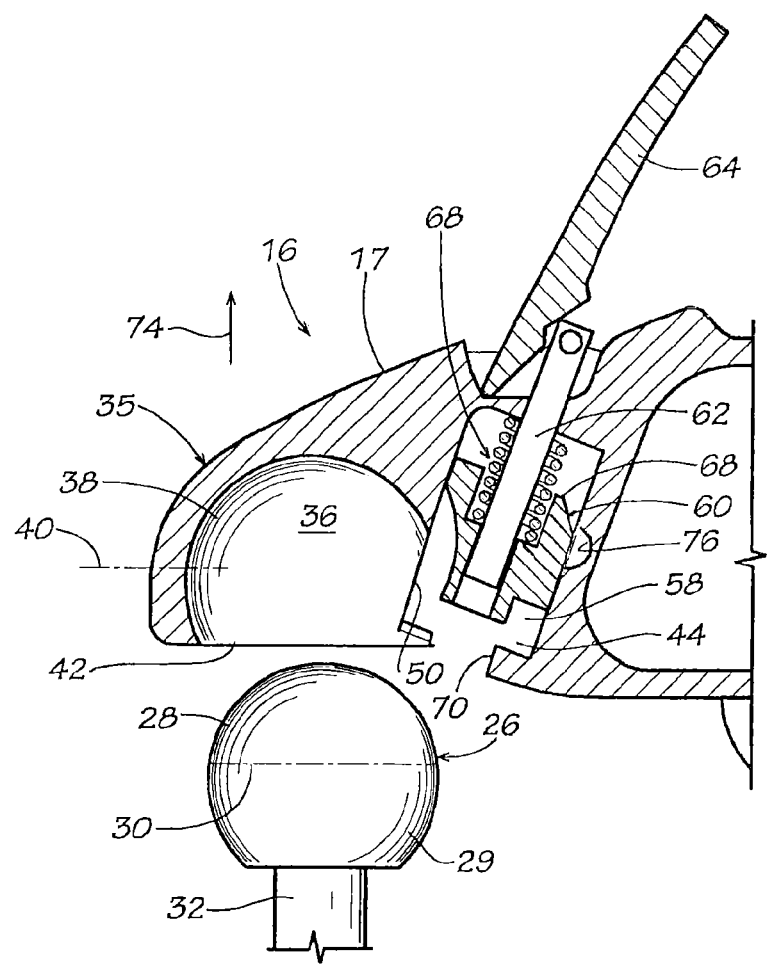
FIG. 10 is a side cross-sectional view of the trailer hitch of FIGS. 8 and 9, showing the lever lifted to withdraw the latch from the hitch ball and the hitch ball moved down out the socket.

As shown in the sequence of FIGS. 8-10, when the socket housing 35 is moved downwardly as indicated by arrow 72 onto the hitch ball 26 (FIG. 8), the ball latch 46 engages the hitch ball 26, and the hitch ball urges the ball latch against the bias of its spring to move out of the way of the hitch ball as the hitch ball moves into the ball socket 36.

Once the ball socket 36 rests upon the hitch ball 26, the complementary shapes of the spherical hitch ball 26 and the semi-spherical recess 56 of the ball latch 46 allow the ball latch to move under the bias of spring 68 from its upward withdrawn position in FIG. 8 to its downward locking position as shown in FIG. 9. It will be noted that the semi-spherical recess 56 extends below the large lateral breadth 40 of the hitch ball. Also, the remaining lower edge of the horizontal opening 42 of the ball socket 36 is lower than the position of the large lateral breadth 40 of the hitch ball. Therefore, the hitch ball 26 and the ball socket 36 become connected and any vertical motion that tends to separate the hitch ball 26 and the ball socket 36 is resisted.

It can be seen from the above description and the associated drawings that the trailer hitch 16 is automatically locked to the hitch ball 26 by simply moving the trailer hitch down onto the hitch ball. The hitch ball engages and pushes the ball latch out of its way until the ball latch passes the large lateral breadth of the hitch ball, whereupon the spring pushes the ball latch into its locking position.

When the trailer hitch is to be separated from the hitch ball, the operator will lift the latch lever 64, as shown in FIG. 10. This lifts the ball latch 46 out of the way of the hitch ball 26 so that the trailer hitch may be lifted as indicated by arrow 74 away from the hitch ball.

As an additional safety feature, the side of the latch slot 44 includes a semi-cylindrical pin opening 76 and a rectilinear safety pin 78 may be inserted through the pin opening 76. The safety pin 78 is positioned and sized to engage the beveled edge 60 of the ball latch 46 to prevent any inadvertent upward movement of the ball latch. When the safety pin 78 is removed from the pin opening 76, the ball latch 46 is free to move against the bias of its spring in an upward direction upon tilting the lever 64 indicated in FIG. 10.

Although preferred embodiments of the invention have been disclosed in detail herein, it will be obvious to those skilled in the art that variations and modifications of the disclosed embodiments can be made without departing from the spirit and scope of the invention as set forth in the following claims.

What is claimed is:

1. A trailer hitch for mounting the draw bar of a trailer to a hitch ball of a towing vehicle, the hitch ball of the towing vehicle including a substantially semi-spherical upper portion and a lower portion that converges beneath a larger lateral breadth of the semi-spherical upper portion to a stem of smaller breadth, said trailer hitch comprising:

a ball socket for mounting on the hitch ball, said ball socket defining a substantially semi-spherical interior upper surface that corresponds in size and shape to the substantially semi-spherical upper portion of the hitch ball for mounting about the substantially semi-spherical upper portion of said hitch ball, a ball latch supported by said ball socket for engaging the hitch ball at the stem of the hitch ball below the larger lateral breadth of the hitch ball for locking the trailer hitch to the hitch ball of the towing vehicle, and said ball socket defines a lock pin opening that is directed through the path of movement of said ball latch, and a lock pin sized and shaped to extend through said lock pin opening for locking said ball latch in position below the larger lateral breadth of the hitch ball.

2. The trailer hitch of claim 1, wherein said ball latch includes a concave surface that is coextensive with said semi-spherical interior upper surface of said ball socket when engaging the hitch ball at the stem of the hitch ball below the larger lateral breadth of the hitch ball.

3. The trailer hitch of claim 2, wherein said concave surface of said ball latch is substantially semi-spherical.

4. The trailer hitch of claim 1, and further including a biasing means supported by said ball socket for urging said ball latch toward the hitch ball at the stem of the hitch ball.

5. The trailer hitch of claim 4, wherein said biasing means comprises a coil compression spring engaging said ball latch.

6. The trailer hitch of claim 1, and further including a latch pin connected to said ball latch, a coil compression spring surrounding said latch pin, a lever connected to said latch pin for retracting said ball latch from below the hitch ball.

7. The trailer hitch of claim 1 and further including a latch slot that intersects said ball socket, said ball latch movable along said latch slot into and out of locking position with respect to said hitch ball, and spring means positioned in said latch slot for urging said ball latch toward the hitch ball at the stem of the hitch ball below the larger lateral breadth of the hitch ball for locking the trailer hitch to the hitch ball of the towing vehicle.

8. A trailer hitch for mounting the draw bar of a trailer to a semi-spherical hitch ball of a towing vehicle, the hitch ball of the towing vehicle including a dome-shaped upper portion that diverges downwardly to a larger breadth intermediate portion and converges in its lower portion from the large breadth intermediate portion toward a stem of smaller breadth, said trailer hitch comprising a socket housing defining a ball socket for mounting on the hitch ball, said ball socket defining an interior upper surface that corresponds in size and shape to the dome shaped upper portion of the hitch ball for surrounding and resting on the dome shaped upper portion of said hitch ball, and a lower portion that is shaped to converge beneath the dome shaped upper portion of the hitch ball for retaining the ball socket on said hitch ball, and said lower portion of said ball socket including a latch that extends toward the lower portion of said hitch ball and is movable away from said hitch ball for forming an opening in said ball socket large enough for the passage of said hitch ball into said ball socket, and biasing means carried by said socket housing for urging said latch toward said lower portion of said ball socket, and said ball socket defines a lock pin opening that is directed through the path of movement of said ball latch, and a lock pin sized and shaped to extend through said lock pin opening for locking said ball latch in position below the larger lateral breadth of the hitch ball.

9. The trailer hitch of claim 8, wherein said latch extends about the lower portion of the hitch ball and forms a portion of said ball socket.

10. The trailer hitch of claim 8, wherein said biasing means comprises a coil spring, and a lever is pivotally mounted to said socket housing and is connected to said latch and moves said latch against the bias of said spring for withdrawing the latch from said ball socket.

11. The trailer hitch of claim 9, wherein said socket housing includes a stop member for limiting the movement of said latch to a position where said latch forms a part of the ball socket.

\* \* \* \* \*